United States Patent
Hidaka et al.

(10) Patent No.: US 6,373,531 B1
(45) Date of Patent: *Apr. 16, 2002

(54) IMAGE PROCESSING APPARATUS, METHOD, AND RECORDING MEDIUM FOR PERFORMING COLOR CORRECTION SUITABLE FOR MATCHING AMBIENT LIGHT FOR DIFFERENT TYPES OF OUTPUT DEVICES

(75) Inventors: Yumiko Hidaka, Inagi; Toshiyuki Mizuno, Yokohama; Yoshinobu Shiraiwa, Machida, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/720,784

(22) Filed: Oct. 3, 1996

(30) Foreign Application Priority Data

Oct. 5, 1995 (JP) .............................................. 7-258631
Dec. 28, 1995 (JP) .............................................. 7-343849

(51) Int. Cl.$^7$ ............................. H04N 5/57; H04N 5/58
(52) U.S. Cl. ...................... 348/603; 348/602; 348/655; 348/708
(58) Field of Search ................................. 345/431, 207; 358/516, 500, 501, 504, 515; 348/223, 191, 657, 658, 649, 655, 656, 675, 607, 624, 659, 645, 674, 708, 602, 603; H04N 5/57, 5/58

(56) References Cited

U.S. PATENT DOCUMENTS

| | | | | |
|---|---|---|---|---|
| 5,081,529 A | * | 1/1992 | Collette | 358/504 |
| 5,172,224 A | * | 12/1992 | Collette et al. | 358/515 |
| 5,231,504 A | * | 7/1993 | Magee | 358/500 |
| 5,532,848 A | * | 7/1996 | Beretta | 358/504 |
| 5,619,347 A | * | 4/1997 | Taniguchi et al. | 348/223 |
| 5,721,811 A | * | 2/1998 | Eckhardt et al. | 358/501 |
| 5,754,184 A | * | 5/1998 | Ring et al. | 345/431 |
| 5,754,448 A | * | 5/1998 | Edge et al. | 358/516 |
| 5,754,682 A | * | 5/1998 | Katoh | 382/162 |
| 5,760,760 A | * | 6/1998 | Helms | 345/102 |
| 6,118,455 A | * | 9/2000 | Hidaka et al. | 345/131 |

OTHER PUBLICATIONS

K. Blair Benson, Television Engineering Handbook, p.2.11–2.12, 2.35–2.36 (1986), Jan. 1986.*

* cited by examiner

Primary Examiner—Michael Lee
Assistant Examiner—Linus H. Lo
(74) Attorney, Agent, or Firm—Fitzpatrick, Cella, Harper & Scinto

(57) ABSTRACT

An image processor includes a determination unit which determines an adaptation ratio of a reference white color value with respect to at least two white color values. Also included are a calculation unit which calculates a reference white color value in accordance with the determined adaptation ratio, and a conversion unit which converts an image signal in accordance with the calculated reference white color value.

24 Claims, 16 Drawing Sheets

IMAGE PROCESSING APPARATUS, METHOD, AND RECORDING MEDIUM FOR PERFORMING COLOR CORRECTION SUITABLE FOR MATCHING AMBIENT LIGHT FOR DIFFERENT TYPES OF OUTPUT DEVICES

BACKGROUND OF THE INVENTION

1. Field of the Invention

The present invention relates to color correction suitable for matching ambient light.

2. Related Background Art

Recent technical improvements on image processing apparatus has resulted in low cost color image processing apparatus. Color images can therefore be used widely, not only in a specific field such as designs with computer graphics but also in general offices.

One problem under such circumstances is that colors of two color images (displayed image and printed image) displayed on a monitor such as a CRT and printed out on a recording medium with a printer or the like, are different in color. Attention is now being paid to color management systems in order to solve this problem.

With color management systems, color images to be formed by a plurality of devices are represented by a common color space in order to avoid different colors on the devices. These systems for making the colors of images on the devices have the same color, rely on the fundamental concept that two colors represented by the same coordinate values in the color space are seen as the same color by the human eye. For current color management systems, a method has been proposed by which a difference in color between devices is corrected by using XYZ tristimulus values as the color space.

Conventional image observation environments will be described with reference with FIG. 17 which show an image 202 and a printed matter 201 on a monitor 203. Reference numeral 204 represents ambient light when an image is observed, the ambient light being, for example, radiation from a fluorescent lamp. Reference numeral 205 represents a screen installed so as to avoid any influence of radiation from the monitor 203 upon observation of the printed matter 201. Under such environment, photometry (measurement of chromaticity coordinates) is executed relative to the printed matter 201 and the image 202 on the monitor 203. The ideal state in color management systems is coincidence of photometric values of the printed matter 201 and the image 202.

However, under the environment such as shown in FIG. 17, ambient light 204 may change in various ways and the printed matter 201 and the image 202 on the monitor 203 are not always observed under the same environment. Even if color matching in the color space is obtained through color management under one kind of ambient light 204, the printed matter 201 and the image 202 are observed to be different colors under another kind of ambient light 204.

SUMMARY OF THE INVENTION

The invention has been made under the above circumstances. It is an object of the present invention to realize color matching irrespective of a change in the observation environment.

According to one aspect of the invention, an image processing apparatus is provided which comprises: means for determining an adaptation ratio of a reference white color value to at least two white color values; means for calculating a reference white color value in accordance with the determined adaptation ratio; and means for converting an image signal in accordance with the calculated reference white color value.

According to another aspect of the invention, an image processing apparatus for reading an original image with input means and outputting the original image from output means, is provided which comprises: first conversion means for converting an image signal read with the input means into a first image signal of a common color space; means for detecting ambient light information; means for storing white color information of the output means; means for determining adaptation ratios of reference white color information to white color information of the output means and the ambient light information; means for calculating the reference white color information in accordance with the adaptation ratios determined by the determining means; second conversion means for converting the first image signal into a second image signal in the common color space in accordance with the reference white color information; and third conversion means for converting the second image signal into a third image signal capable of being output from the output means.

The present invention solves the above problem and aims at realizing the same observed color of a subject and its image even if the background color becomes different.

According to another aspect of the invention, an image processing method for converting a color signal by using a reference white color signal is provided wherein the reference white color signal is determined in accordance with background color.

According to another aspect of the invention, an image processing method for converting a color signal. by using a reference white color signal calculated from adaptation ratios for two or more white colors, is provided wherein the adaptation ratio is calculated in accordance with background color.

The above and other objects, and features of the invention will become apparent from the following detailed description of embodiments when read in conjunction with the accompanying drawings.

DETAILED DESCRIPTION OF THE PREFERRED EMBODIMENTS

An example of a system embodying the present invention will be described specifically with reference to the accompanying drawings.

The configuration of the invention may be realized by a CPU executing software programs which realizes process to be executed by each unit of the following embodiments.
<First Embodiment>

Figure 1:
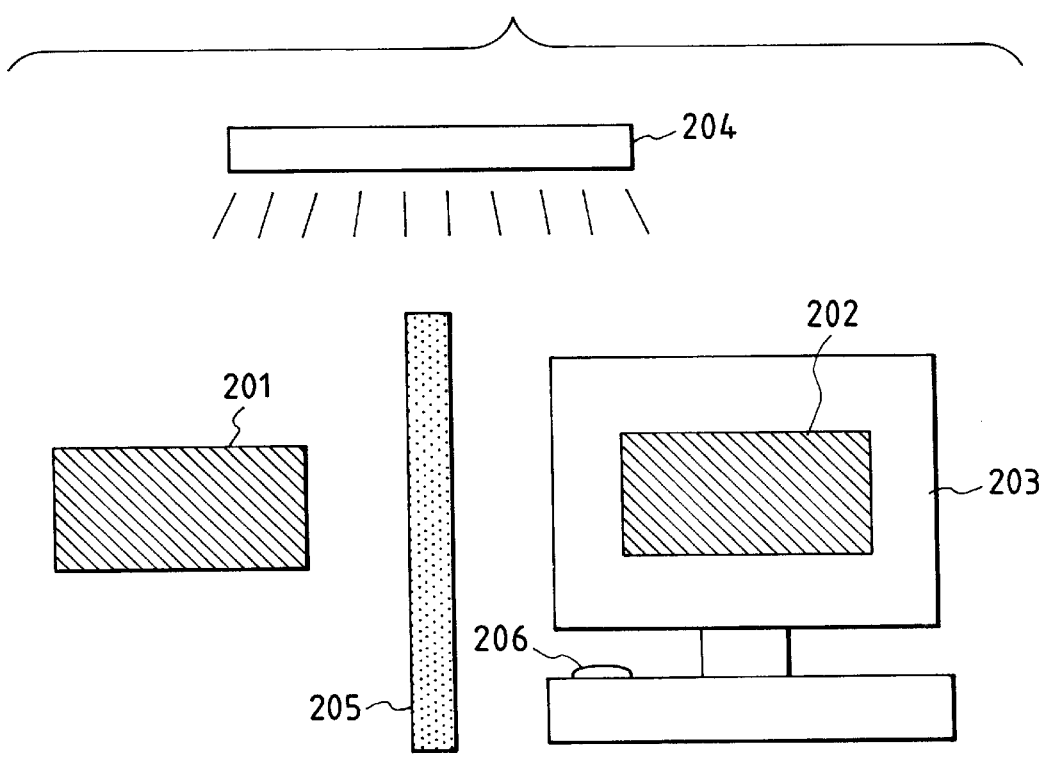
FIG. 1 is a diagram illustrating the observation environment of an image.
Figure 17:
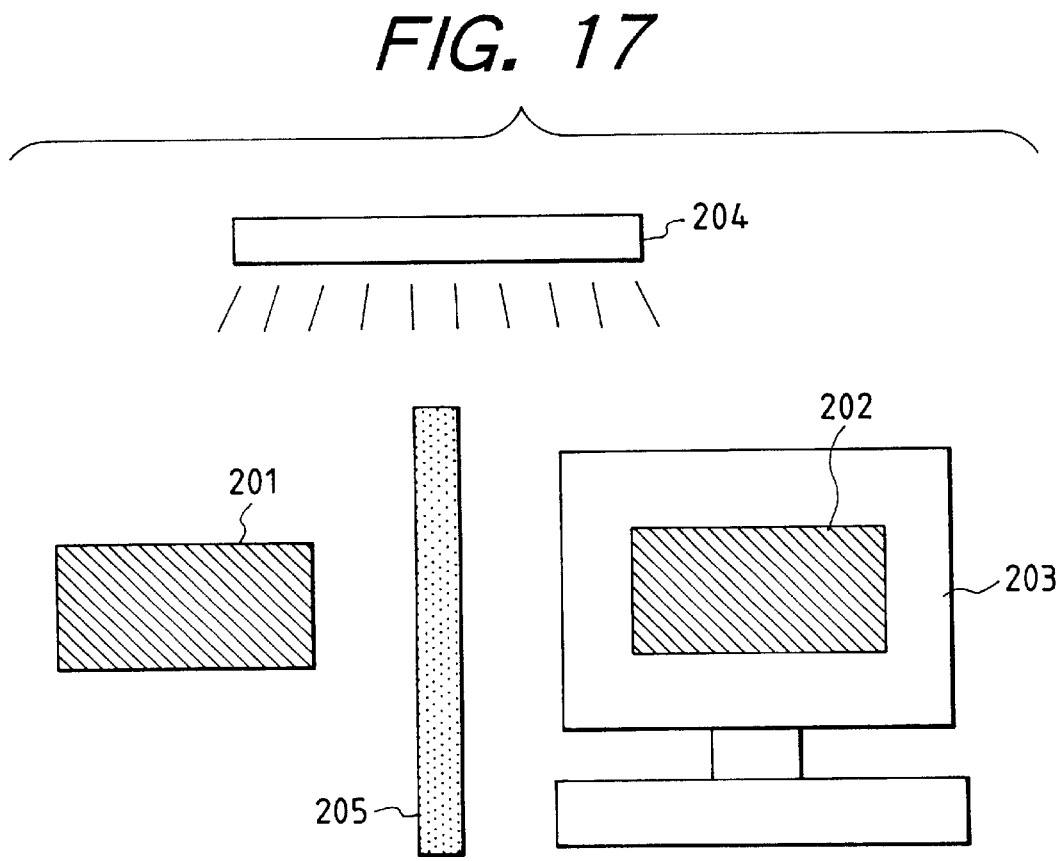
FIG. 17 is a diagram illustrating conventional observation environments of an image.

FIG. 1 illustrates the observation environment under which the embodiment of the invention is realized. In FIG. 1, like elements to those of a conventional example shown in FIG. 17 are represented by using identical reference numerals and the description thereof is omitted. In FIG. 1, reference numeral 206 represents an ambient light sensor which is mounted on a monitor 203 or an unrepresented printer, for the measurement of ambient light 204. In the following description, a printed matter 201 and a display image 202 on the monitor 203 are observed. The monitor 203 of this embodiment is not limited to a CRT display but other devices such as a liquid crystal display may be used.

Whether the printed matter 201 and the display image 202 are observed by an observer as the same image under the environments shown in FIG. 1 may be determined in the following manner.

Information about the ambient light 204 is detected with the ambient light sensor 206, and in accordance with the ambient light information, the chromaticity values (e.g., XYZ) of each color constituting the image on an output device are estimated. The estimated chromaticity values are reproduced with as high a fidelity as possible by referring to the characteristic profile of each device in order to obtain the same color. The value of ambient light is calculated in accordance with light detected with the ambient light sensor 206. The chromaticity value may be that of the light source or that of a paper sheet under the ambient light.

Figure 2:
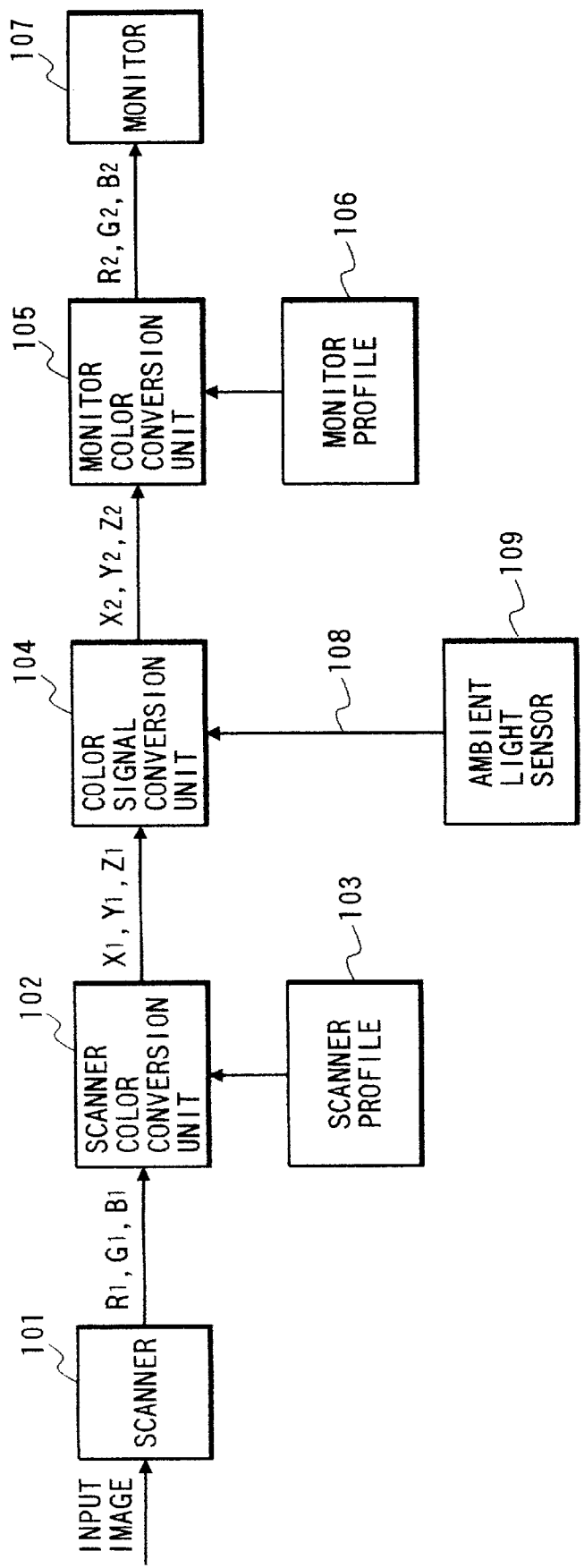
FIG. 2 is a diagram illustrating a color conversion method according to a first embodiment.

The configuration for realizing such a process is shown in FIG. 2.

In FIG. 2, reference numeral 101 represents a scanner having a CCD sensor and the like, reference numeral 102 represents a scanner color conversion unit for converting RGB values read with the scanner 101 into XYZ values, and reference numeral 103 represents a scanner profile which holds the color conversion characteristics of the scanner color conversion unit 102. Reference numeral 104 represents a color signal conversion unit which corrects the XYZ values to values most suitable for the present observation environment, in accordance with the ambient light information on line 108, as read with the sensor 109. Reference numeral 105 represents a monitor color conversion unit which converts the XYZ values into RGB values to be used for the display on the monitor 108 such as a CRT, and reference numeral 106 represents a monitor profile which stores the color conversion characteristics of the monitor color conversion unit 105.

First, the scanner 101 picks up an input image (printed matter 201). With reference to the scanner profile 103 previously storing the scanner characteristic data, the scanner color conversion unit 102 converts the $R_1$, $G_1$, and $B_1$ values obtained by the scanner 101 into $X_1$, $Y_1$, and $Z_1$ values which are device independent color signals. With reference to the ambient light information on line 108 obtained by the sensor 109 which senses ambient light, the color signal conversion unit 104 converts the color signal values $X_1$, $Y_1$, and $Z_1$ into signal values $X_2$, $Y_2$, and $Z_2$ which are expected to be photometric values under the ambient light environment. The monitor color conversion unit 105 calculates the values $R_2$, $G_2$, and $B_2$ to be input to the monitor 107 corresponding to the values $X_2$, $Y_2$, and $Z_2$, with reference to the monitor profile 106 previously storing the monitor characteristic values.

With the color management described as above, the read image signal is represented by $X_2$, $Y_2$, and $Z_2$ values in the XYZ color space, matching the present ambient light information on line 108.

It is expected that such color conversion taking ambient light into consideration leads to a more proper color management.

However, in the above example, the color of the print image 201 recognized by the operator is color (non-luminous color) reflected from the recording medium, whereas the color of the display image 202 is color (luminous color) radiated from the light source. Since the luminous mode is different, even if two colors are represented by the same values in the same color space, in many cases the operator does not recognize them to be the same color.

The following color management may be used so as to allow an operator to sense two colors represented by the same values in the same color space to be the same color even if the images have different luminous modes.

It can be considered that the human eye recognizes all colors with reference to the white color. Consider for example that a monitor display image and a print image are observed under a certain kind of ambient light. In this case, there are a number of white colors which can be used as reference to color recognition by the human eye, such as the white color on a monitor, the white color of ambient light, and the white color (underlying paper white color) on a print image. It can be said that the human eye recognizes colors with reference to the white color which is adapted to a plurality of white colors mixed at a predetermined ratio.

Therefore, if the white color (hereinafter called reference white color) used as a reference for color observation by the human eye is calculated and all colors constituting an image are converted based upon the reference white color, more suitable color management can be performed.

More specifically, in calculating the reference white color, first an adaptation ratio of the reference white color on a monitor under illumination by a fluorescent lamp to the ambient white color is predetermined. By using this adaptation ratio, a new reference white color is calculated. By using this new reference white color, more suitable color management can be realized.

With such color management, however, a fixed adaptation ratio is used for calculating the reference white color irrespective of the observation environment. Not only a fluorescent lamp, but also various ambient light sources are actually used as ambient light for image observation. Since the adaptation ratio of each white color to the reference white color changes with ambient light, if the adaptation ratio is fixed to one particular value, it cannot be expected that the reference white color can be calculated which is optimum for every observation environments. Also in the case where light from a fluorescent lamp mixed with different light is used as the ambient light, the optimum reference white light cannot be calculated.

In this embodiment, the optimum reference white color under any one of observation environment can be calculated and the most suitable color management can be conducted.

Figure 3:
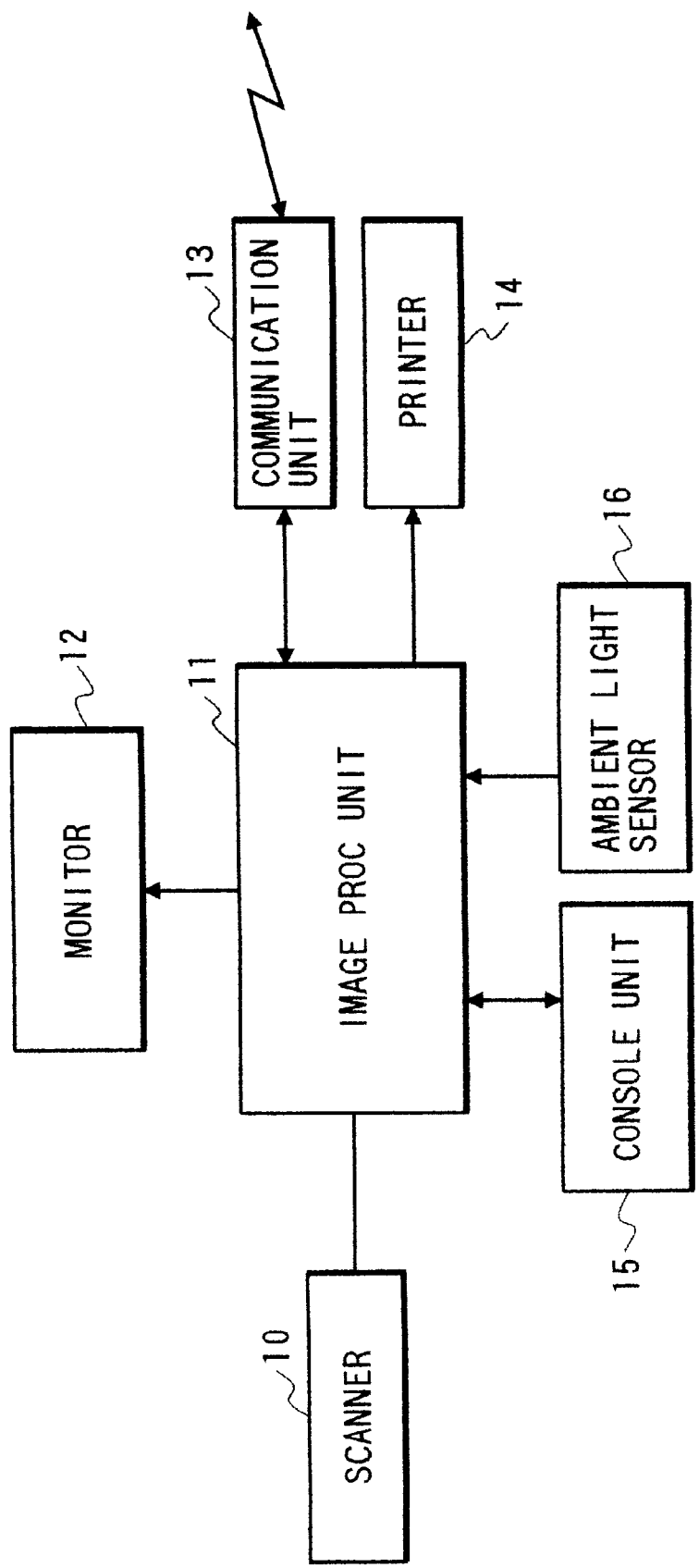
FIG. 3 is a block diagram showing the structure of an image processing apparatus of the first embodiment.

FIG. 3 is a block diagram showing the structure of an image processing apparatus of this embodiment. In FIG. 3, reference numeral 10 represents a scanner for optically reading image data on a recording medium with an image pickup device such as a CCD, reference numeral 11 represents an image processing unit characteristic to this embodiment for performing various image processing operations such as a color conversion process, and reference numeral 12 represents a monitor for displaying image data. Reference numeral 13 represents a communication unit for image data transfer via general communication lines, reference numeral 14 represents a printer for printing out image data on a recording medium, and reference numeral 15 represents a console unit such as an operation panel for entering a command by an operator or for notifying the operator of a state of the image processing apparatus. Reference numeral 16 represents an ambient light sensor for detecting ambient light under the present environments, as will be described later.

In this embodiment, the image processing unit 11 performs suitable color conversion processes in order that the color of an original image read with the scanner 10 and the color of the image displayed on the monitor can be recognized to be the same color under any one of the observation environments.

Figure 4:
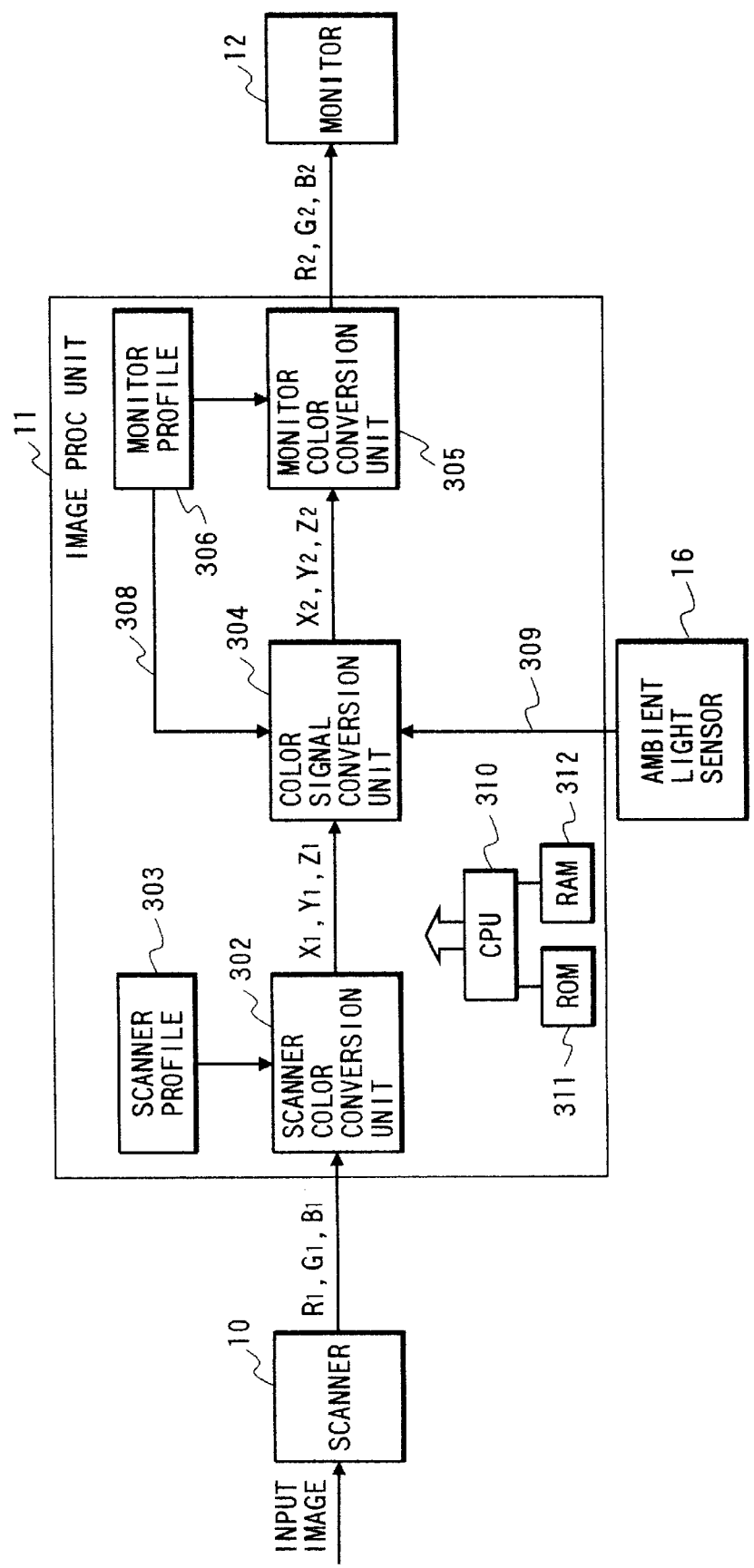
FIG. 4 is a block diagram showing the structure of an image processing unit of the first embodiment.

The block diagram of FIG. 4 shows particular units for performing the color conversion process featuring this embodiment. In the structure shown in FIG. 4, the image processing unit 11 performs color processing of image data read with the scanner 10 and displays it on the monitor 12. Reference numeral 302 represents a scanner color conversion unit, reference numeral 303 represents a scanner profile, reference numeral 304 represents a color signal conversion unit, reference numeral 305 represents a monitor color conversion unit, and reference numeral 306 represents a monitor profile. Reference numeral 310 represents a CPU which collectively controls each unit of the image processing unit 11 in accordance with control programs stored in a ROM 311, for executing the processes such as those shown in the flow chart to be described later. Reference numeral 312 represents a RAM which is used as a working area of CPU 310. The detailed structure of the image processing unit 11 shown in FIG. 4 shows only the circuit portion related to the color conversion process, and the structure related to the other image processing is omitted. An A/D converter unit for converting analog image signal input from the scanner 10 and other structures essential for the general image processing are also omitted in FIG. 4.

The color management process of this embodiment will be described with reference to the structure shown in FIG. 4 and the flow chart shown in FIG. 5.

Figure 5:
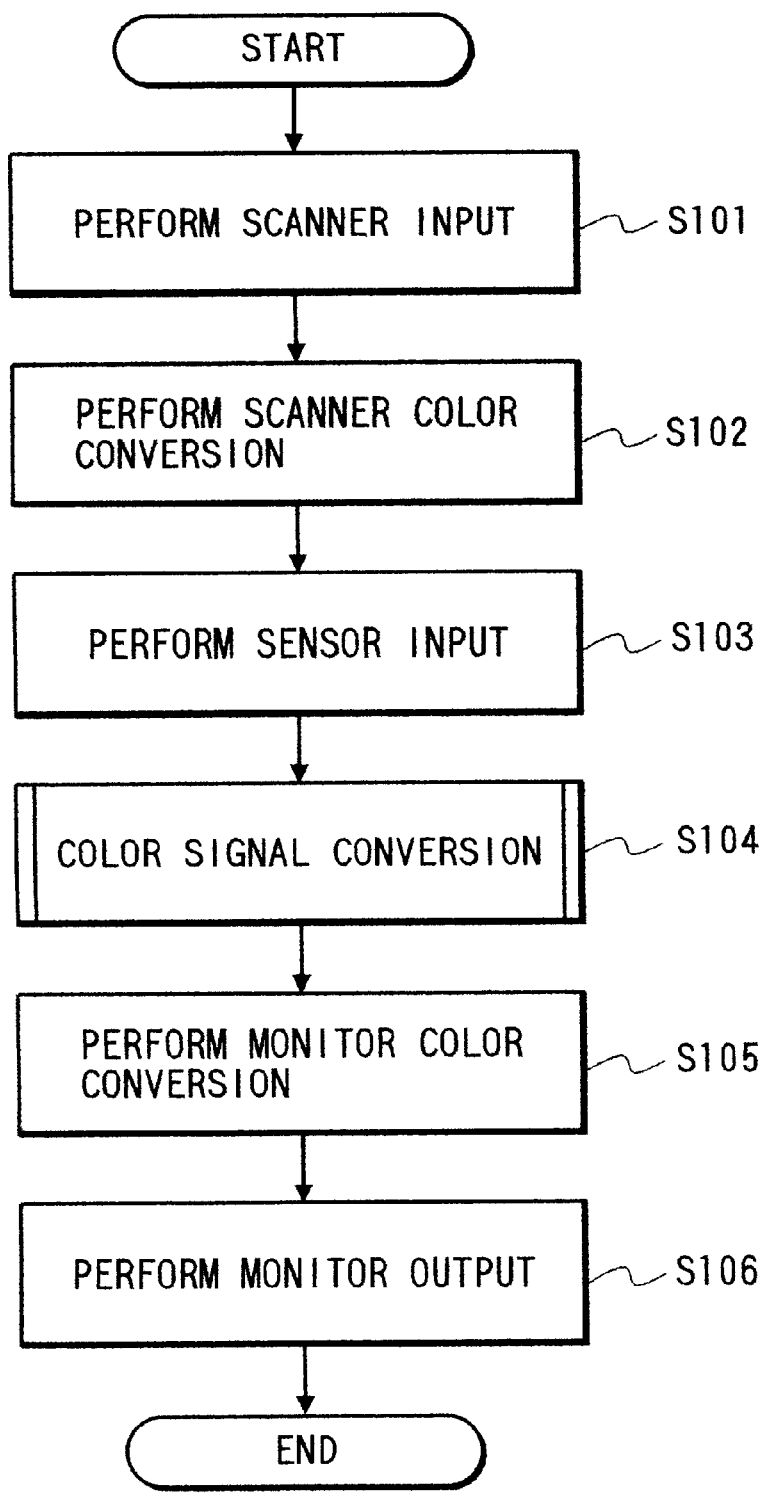
FIG. 5 is a flow chart illustrating a color management procedure of the first embodiment.

Referring to FIG. 5, first at step S101 an image output to a recording medium as an original image is read with the scanner to obtain $R_1$, $G_1$, and $B_1$ image signals. The color of the original image is a so-called non-luminous color recognized as reflected light.

Next, at step S102, the $R_1$, $G_1$, and $B_1$ color signals read with the scanner 10 and dependent upon the characteristics of the scanner 10 are input to the scanner color conversion unit 302 of the image processing unit 11. The scanner color conversion unit 302 converts the input $R_1$, $G_1$, and $B_1$ color signals into $X_1$, $Y_1$, and $Z_1$ values in the XYZ color space independent of device characteristics, with reference to the information about the scanner profile 303.

The scanner profile 303 stores in advance the information about the color characteristics and the like of the scanner 10, and is realized by a color conversion matrix for converting scanner dependent RGB values into device independent XYZ values, using a look-up table (LUT), or the like. Next, at step S103 ambient light information on line 309 is fetched from the ambient light sensor 16. At step S104 the $X_1$, $Y_1$, and $Z_1$ color signals converted at step S102 are converted into $X_2$, $Y_2$, and $Z_2$ signals by the color signal conversion unit 304 in accordance with the ambient light information on line 309 from the ambient light sensor 16 and white light information from monitor profile 306 from the monitor profile line 308. The $X_2$, $Y_2$, and $Z_2$ signals are generated while considering the color development mode correction regarding the ambient light and non-luminous/luminous colors. This color signal conversion process by the color signal conversion unit 304 at step S104 will be detailed later.

At step S105, the $X_2$, $Y_2$, and $Z_2$ signals converted at step S104 are input to the monitor color conversion unit 305 which converts them into $R_2$, $G_2$, and $B_2$ signals dependent on the characteristics of the monitor 12, with reference to the information from the monitor profile 306.

The monitor profile 306 stores in advance the information about the color characteristics and the like of the monitor 12, such as monitor white color information including the color temperature and emission luminance of the monitor 12, and the chromaticity value of phosphor, and color conversion characteristic information for conversion from a signal in the standard color space into a device dependent color space signal.

Lastly, at step S106 the original image read with the scanner at step S101 is displayed on the monitor 12.

Next, the color signal conversion process by the color signal conversion unit 304 at step S104 will be detailed.

Figure 6A:
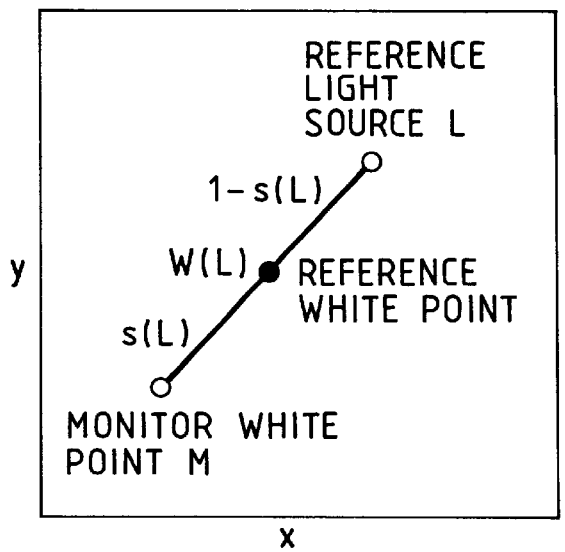
FIGS. 6A to 6C are diagrams illustrating a method of calculating a reference white color when ambient light is from a reference light source.
Figure 6B:
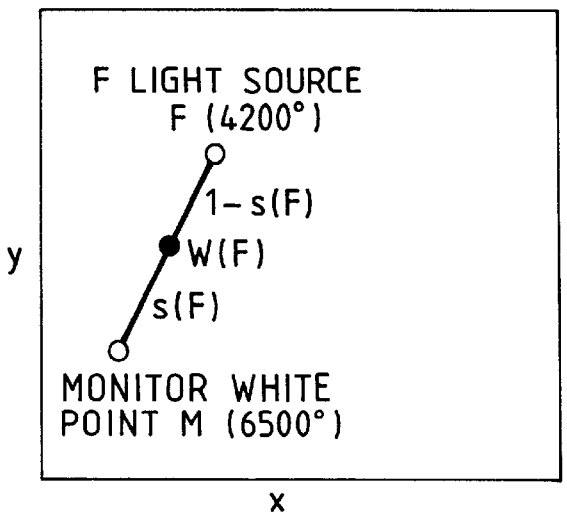
Figure 6C:
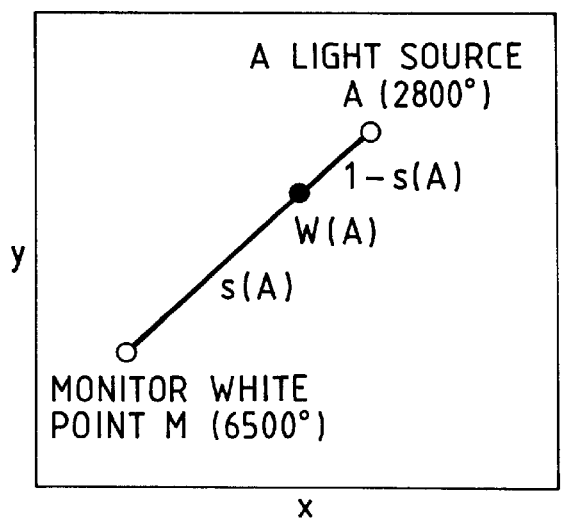

First, with reference to FIGS. 6A to 6C, the outline of the conversion process by the color signal conversion unit 304 will be described. FIGS. 6A to 6C illustrate a method of calculating the position in a predetermined color space of the reference white color which is used as a reference for the human color sense under the present environment.

It can be considered that in observing an image displayed on the monitor as in this embodiment, the human eye does not recognize all colors by perfect adaptation only to the white color on the monitor 12, but to both the white color on the monitor 2 and ambient light at a certain adaptation ratio. Therefore, as shown in FIG. 6A, the reference white light point as a reference to color observation is positioned at a predetermined adaptation ratio (s:1−s) between the white color on the monitor 12 and ambient light.

Figure 7:
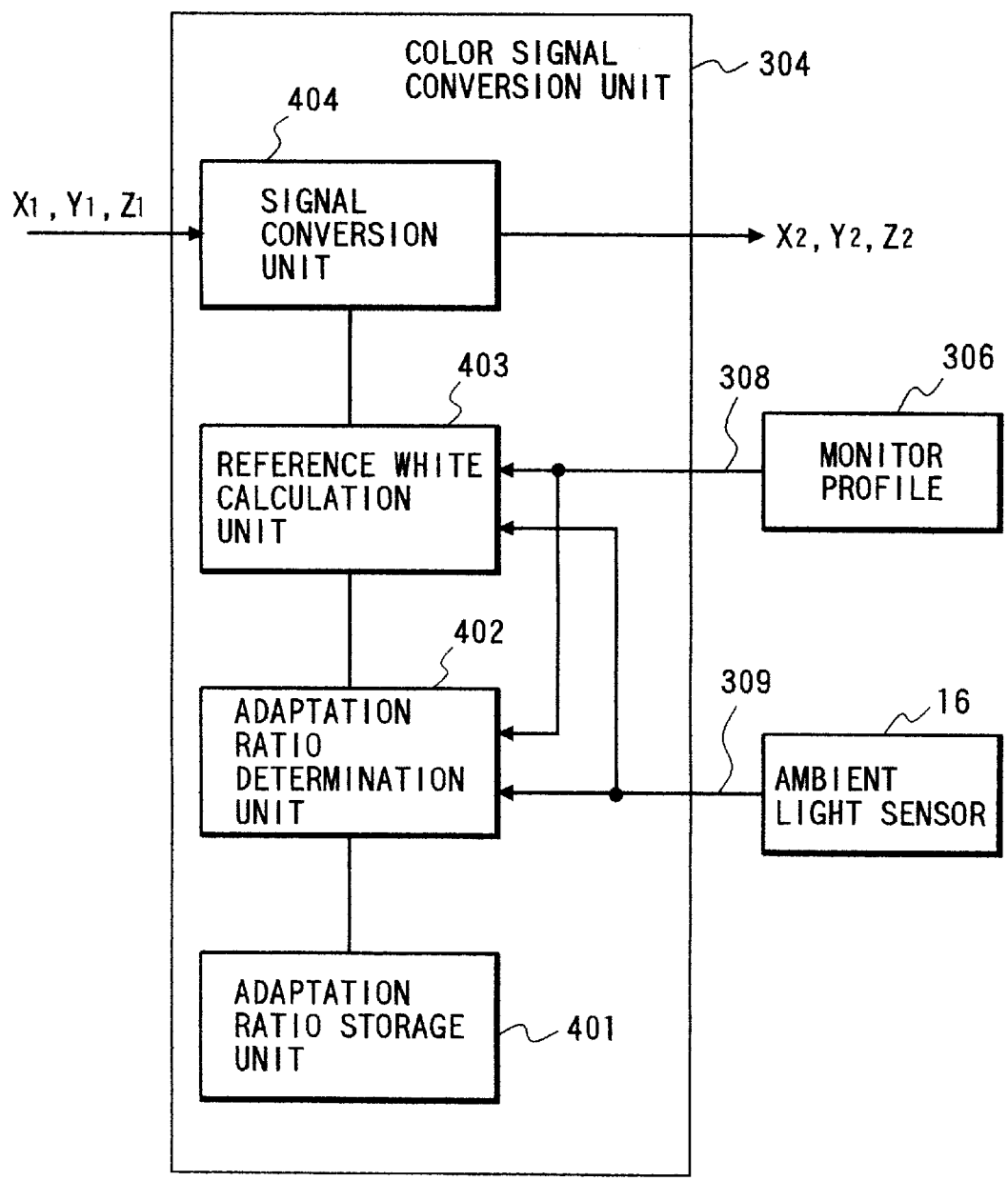
FIG. 7 is a block diagram showing the detailed structure of a color signal conversion unit of the first embodiment.

The detailed block structure of the color signal conversion unit 304 is shown in FIG. 7.

In FIG. 7, reference numeral 401 represents an adaptation ratio storage unit for storing in advance a plurality of adaptation ratios, reference numeral 402 represents an adaptation ratio determination unit for determining a proper adaptation ratio, reference numeral 403 represents a reference white color calculation unit, and reference numeral 404 represents a signal conversion unit for converting actual color signals. Input to the adaptation ratio determination unit 402 and reference white color calculation unit 403 are the ambient light information on line 309 detected with the ambient light sensor 16 and the monitor white color information on line 308 stored in the monitor profile 306.

The processes to be executed by the color signal conversion unit 304 shown in FIG. 7 will be detailed with reference to the flow chart of FIG. 8.

The ambient light information on line 309 has been obtained at Step S103 shown in FIG. 5 by the ambient sensor 16 as the information of light (ambient light) from ambient light sources. The ambient light information on line 309 indicates the present operation environments of the image processing apparatus of this embodiment. The ambient light information on line 309 may be spectrum data or color signals in the XYZ color space or RGB color space. The ambient light sensor 16 of the image processing apparatus may not be used, but an operator may manually input color signals or the like corresponding to the ambient light information on line 309 through the console unit 15. The ambient light information on line 309 corresponds to a reference light source L shown in FIG. 6A. The monitor white color information on line 308 has also been obtained already from the monitor profile 306, the monitor white color information on line 308 being the white color temperature, emission luminance, chromaticity values, and the like of the monitor for displaying an image. The monitor white color information on line 309 corresponds to a monitor white color point M shown in FIG. 6A.

The adaptation ratio storage unit 401 stores in advance adaptation ratios for a plurality of reference light sources and monitor white color points, in the form of a LUT or the like. In this embodiment, as the reference light sources, light sources A, C, D93, D65, D50, F and the like is used.

Figure 8:
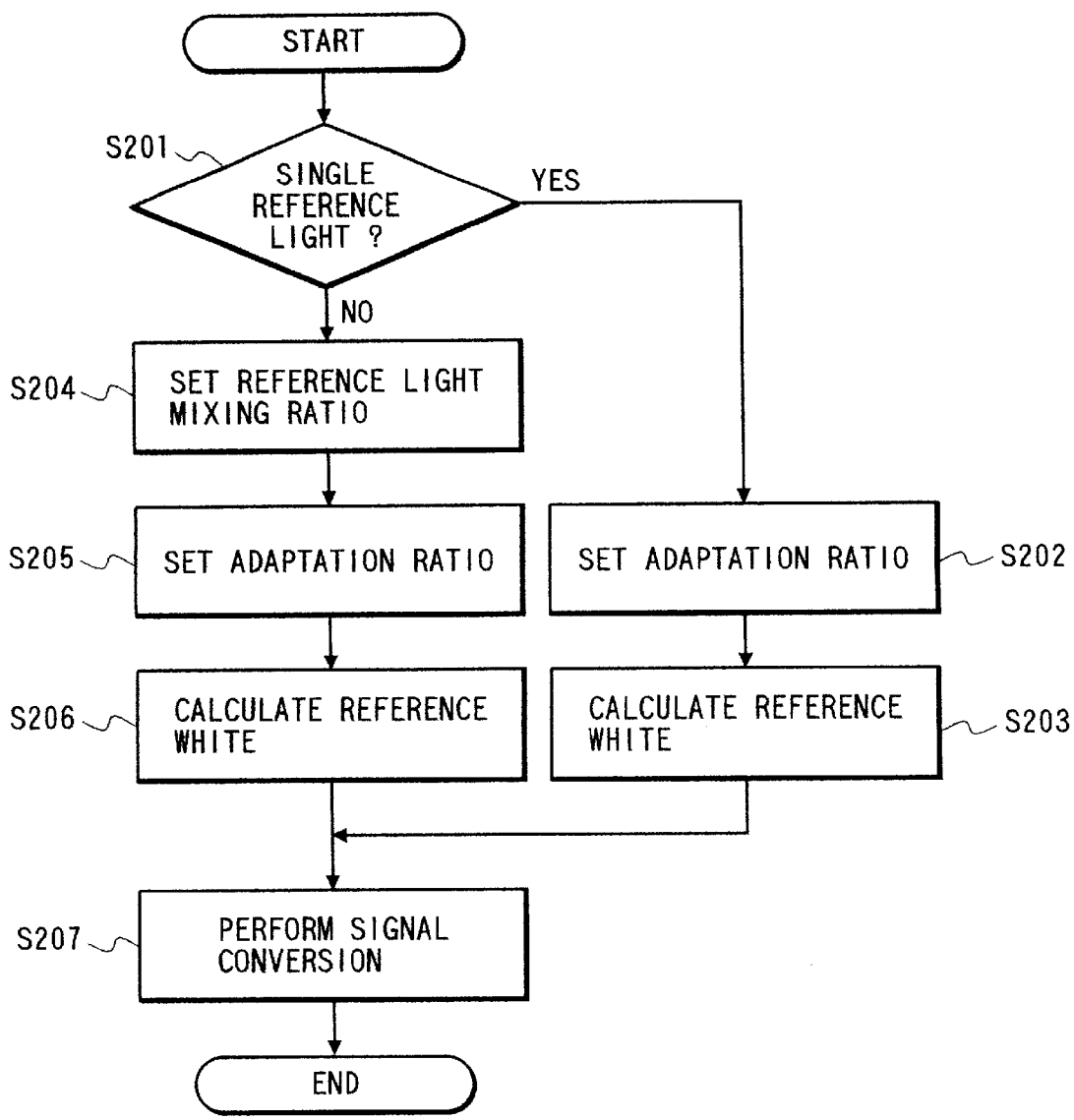
FIG. 8 is a flow chart illustrating a color signal conversion procedure of the first embodiment.

At step S201 shown in FIG. 8, the adaptation ratio determination unit 402 checks whether the ambient light is a single reference light of any one of the above described reference light sources, by referring to the ambient light information on line 309. If it is judged that the ambient light source is a single reference light source, the flow advances to step S202.

At step S202, the adaptation ratio determination unit 402 selects a proper adaptation ratio in the adaptation ratio storage unit 401 in accordance with the ambient light information on line 309 and monitor white color information on line 308. The selected adaptation ratio is input to the reference white color calculation unit 403 which calculates at step S203 reference white color data suitable for the present observation environment in accordance with the ambient light information on line 309 and monitor white color information on line 308 as input to the adaptation ratio determination unit 402.

A method of calculating reference white color data at the reference white color calculation unit 403 will be described specifically.

For example, it is assumed that an adaptation ratio of the reference white color point (visual sense reference white color point) W to the monitor white color point M is s, the adaptation ratio to the reference light source point L is represented by (1−s) as shown in FIG. 6A. If the tristimulus values and chromaticity values of the reference light source point L corresponding to the ambient light information on line 309 are represented by $X_{w1}, Y_{w1}, Z_{w1}, x_{w1},$ and $y_{w1}$ and those of the monitor white color point M corresponding to the monitor white color information on line 308 are represented by $X_{w2}, Y_{w2}, Z_{w2}, x_{w2},$ and $y_{w2}$, then the tristimulus values $X_w, Y_w,$ and $Z_w$ of the reference white color signal and its chromaticity values $x_w$ and $y_w$ are given by the following equations (1) and (2).

Tristimulus Values $$Xw=(1-s)\cdot Xw1+s\cdot Xw2$$
$$Yw=(1-s)\cdot Yw1+s\cdot Yw2$$
$$Zw=(1-s)\cdot Zw1+s\cdot Zw2 \quad (1)$$

Chromaticity Values $$xw=(1-s)\cdot xw1+s\cdot xw2$$
$$yw=(1-s)\cdot yw1+s\cdot yw2 \quad (2)$$

The adaptation ratios of the reference white color point W to the monitor white color point M and reference light source L change with the ambient light (reference light source) during observation of an image. Therefore, the adaptation ratio s in the equations (1) and (2) changes with the ambient light so that the reference white color point M changes with the ambient light (reference light source).

For example, if the color temperature of the monitor 12 is 6500 K and the reference light source corresponding to the ambient light is a D65 light source (correlative color temperature 6504 K), there is almost no difference between the ambient light and monitor white color. Therefore, three points (M, W, L) shown in FIG. 6A are represented by generally one point.

If the color temperature of the monitor 12 is 6500 K. and the ambient light is a F light source of a fluorescent lamp, the human eye is adapted to a certain degree to both the monitor white light and ambient light. The adaptation ratio is about 50% to 40% relative to the monitor white color point M and about 50% to 60% relative to the ambient light (reference light source point F). This is indicated in FIG. 6B in which W(F) is a reference white color point under the F light source.

If the color temperature of the monitor 12 is 6500 K and the ambient light is an A light source, the human eye is adapted to both the monitor white light and ambient light, similar to the fluorescent lamp. The adaptation ratio is significantly shifted to the ambient light and is 20% to 10% relative to the monitor white color point M and about 80% to 90% relative to the ambient light (reference light source point A). This is indicated in FIG. 6C in which W(A) is a reference white color point under the A light source.

In this embodiment, therefore, by determining an optimum adaptation ratio in accordance with the ambient light, an optimum reference white color point can be calculated.

In the above, the method of calculating the reference white color point has been described in which the ambient light source is one of reference light sources. Next, the operation will be described in which it is judged at step S201 that the ambient light source is not a single reference light source but a plurality of mixed reference light sources.

At step S204 the adaptation ratio determination unit 402 judges what mixing ratio of reference light sources the present ambient light has, in accordance with the ambient light information 309.

The adaptation ratio is calculated at step S205. The adaptation ratio for any mixed reference light sources can be calculated in accordance with the adaptation ratios of these mixed reference light sources which have been already stored in the adaptation ratio storage unit 401.

A method of calculating an adaptation ratio of the ambient light containing mixed reference light sources at step S205 will be described specifically with reference to FIG. 9.

Figure 9:
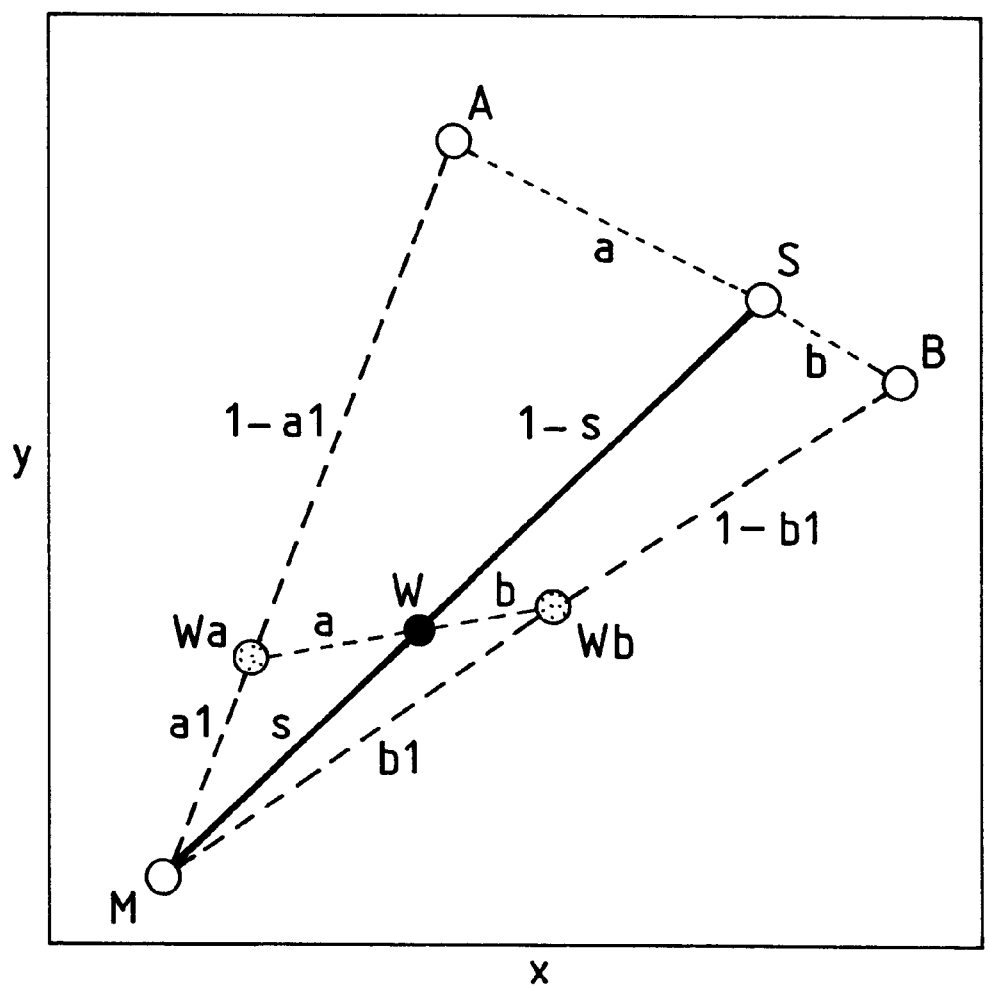
FIG. 9 is a diagram illustrating a method of calculating the reference white color when ambient light is mixed light from reference light sources.

FIG. 9 illustrates ambient light S of the ambient light information 309 which is mixed reference light sources A and B with a mixing ratio of a:b. It is assumed that the adaptation ratio storage unit 401 stores the adaptation ratio of the reference light source A as the ambient light to the monitor white color information 308 which ratio is a1 (1−a1 to the ambient light A) and the adaptation ratio of the reference light source B as the ambient light to the monitor white color information 308 which ratio is b1 (1−b1 to the ambient light B).

As the adaptation ratio determination unit 402 determines that the ambient light S is mixed reference light sources A and B, it extracts the adaptation ratios a1 and b1 of the reference light sources A and B to the monitor white color information 308, and outputs them as well as the mixing ratio a:b to the reference white color calculation unit 403.

Next, at step S206 the reference white color is calculated. With the above processes, the coordinate values of the monitor white color point M, ambient light S, and reference light sources A and B are known in the XYZ color space coordinate system shown in FIG. 9. The reference white color calculation unit 403 first calculates the reference white color points Wa and Wb for the reference light sources A and B relative to the monitor white color point M. Since the mixing ratio of the reference light sources A to B of the ambient light S is a:b, the reference white color point W under the ambient light S is calculated in accordance with the mixing ratio of a:b between the reference white color point Wa under the reference light source A and the reference white color point Wb under the reference light source B. The calculation equations are given by the following equations (3).

$$Wa = (1-a1) \cdot A + a1 \cdot M$$

$$Wb = (1-b1) \cdot B + b1 \cdot M$$

$$W = a \cdot Wa + b \cdot Wb \qquad (3)$$

The reference white color calculation unit 403 calculates the reference white color point W under the ambient light S by using the above equations (3). The calculation method for the reference white color point W by the reference white color calculation unit 403 is not limited to the above, but the following calculation method for the reference white color point W may also be used.

For example, adaptation ratios for possible ambient mixed reference light sources are calculated in advance and stored in the adaptation ratio storage unit 401 in the form of a LUT or the like. The adaptation ratio determination unit 402 extracts one adaptation ratio of ambient light near to the ambient light information 309 to calculate the reference white color point by using this adaptation ratio. Although precision is somewhat lowered, the amount of calculation is less and the process speed can be improved.

In the above manner, the reference white point for the ambient light can be obtained at steps S203 and S206.

Next, at step S207 the signal conversion unit 404 performs color conversion of the entire image in accordance with the reference white color point signal calculated by the reference white color calculation unit 403.

The image displayed on the monitor 12 is observed with the reference white color calculated in the above manner, whereas the printed matter such as an original image read with the scanner is observed with the reference white color adapted to the underlying white color of the recording medium (paper) and the white color of the ambient temperature.

By representing the reference white color point by $X_w$, $Y_w$, and $Z_w$ and the ambient light by $X_s$, $Y_s$, and $Z_s$ in the XYZ color space, the image signals $X_1$, $Y_1$, and $Z_1$ read with the scanner 10 can be converted into the image signals $X_2$, $Y_2$, and $Z_2$ to be displayed on the monitor 12, by using the equation (4) which are modifications of the VonKreis equation.

$$\begin{pmatrix} X_2/Xw \\ Y_2/Yw \\ Z_2/Zw \end{pmatrix} = \begin{pmatrix} X_1/Xs \\ Y_1/Ys \\ Z_1/Zs \end{pmatrix} \qquad (4)$$

$$\therefore \begin{pmatrix} X_2 \\ Y_2 \\ Z_2 \end{pmatrix} = \begin{pmatrix} X_1 \\ Y_1 \\ Z_1 \end{pmatrix} \begin{pmatrix} Xw/Xs \\ Yw/Ys \\ Zw/Zs \end{pmatrix}$$

The signal conversion unit 404 can also perform contrast conversion while considering the human visual sense, i.e., gamma characteristics. This conversion equation (5) is given in the following.

$$\begin{pmatrix} X_2/Xw \\ Y_2/Yw \\ Z_2/Zw \end{pmatrix} = \begin{pmatrix} X_1/Xs \\ Y_1/Ys \\ Z_1/Zs \end{pmatrix} \gamma \qquad (5)$$

$$\therefore \begin{pmatrix} X_2 \\ Y_2 \\ Z_2 \end{pmatrix} = \begin{pmatrix} X_1/Xs \\ Y_1/Ys \\ Z_1/Zs \end{pmatrix} \gamma \begin{pmatrix} Xw \\ Yw \\ Zw \end{pmatrix}$$

In the above manner, the color signal conversion unit 304 converts the input image signals $X_1$, $Y_1$, and $Z_1$ into the image signals $X_2$, $Y_2$, and $Z_2$ suitable for the present observation environments.

The image signals $X_2$, $Y_2$, and $Z_2$ obtained by the color signal conversion process illustrated in the flow chart of FIG. 8 are converted into $R_2$, $G_2$, and $B_2$ monitor input signals by the monitor color conversion unit 305 with reference to the monitor profile 306. With these $R_2$, $G_2$, and $B_2$ signals, an image subjected to color management is displayed on the monitor 12.

If the color temperature indicated by the ambient light information (ambient light S) 309 is lower than 5000 K, it is preferable that the adaptation ratio determination unit 402 sets the adaptation ratio to have a larger adaptation to the ambient light S side than the real adaptation ratio at 5000 K. This is because it is empirically known that such setting makes the monitor 12 easy to observe.

In the above embodiment, the XYZ color space is used as the common color space. Other color spaces may be used if they can absorb differences between devices. For example, an L*a*b* color space and an L*u*v* color space may also be used.

The ambient light sensor 16 is used as a discrete member for the simplicity of description. The ambient light sensor may be integrally formed if the observation environment can be measured. For example, the ambient light sensor may be integrally mounted on the surface of the monitor 12 or on the upper surface of the printer 14.

In the above embodiment, the adaptation ratio is determined from the ambient light information on line 309 and monitor white color information on line 308. Obviously, it may be determined only from the ambient light information on line 309 or only from the monitor white color information.

As described above, according to the embodiment, the visual sense reference white color of an image displayed on the monitor is calculated in accordance with the present ambient light information, and the input image signals are converted in accordance with this visual sense reference white color. Therefore, an operator can observe both the color (non-luminous color) of an original image such as a printed matter and the color (luminous color) of an image displayed on the monitor, as the same color. Color management suitable the for observation environment is therefore possible.

In the above embodiment, in order to calculate the reference white color, the adaptation ratios of two white colors including the monitor white color and ambient white color are set. The adaptation ratios of three or more white colors may also be set depending upon environmental conditions, with similar effect of the inventive concept.

In the above embodiment, the adaptation ratios of two white colors including the monitor white color and ambient white color are set. The embodiment is not limited to only two factors for determining the adaptation ratios, and the adaptation ratios may be set in accordance with various visual environments including a monitor color temperature, a background color, an adaptation time, a monitor surface reflectivity, an underlying color of a recording medium, and the like.

<Second Embodiment>

While an original image displayed on the screen of a monitor is observed, colors of the original image and its peripheral colors (background color) enter the human eye. The human eye recognizes color with reference to peripheral colors. It is therefore known that even if the same color is displayed at the central area, this color gives a different impression if the background color is different. Therefore, the same color of a displayed image at the central area is recognized as a different color.

The second embodiment solves this problem and aims at making the color of the same image recognizable as the same color even if the background color is different.

The second embodiment will be described in detail with reference to the accompanying drawings.

Figure 10:
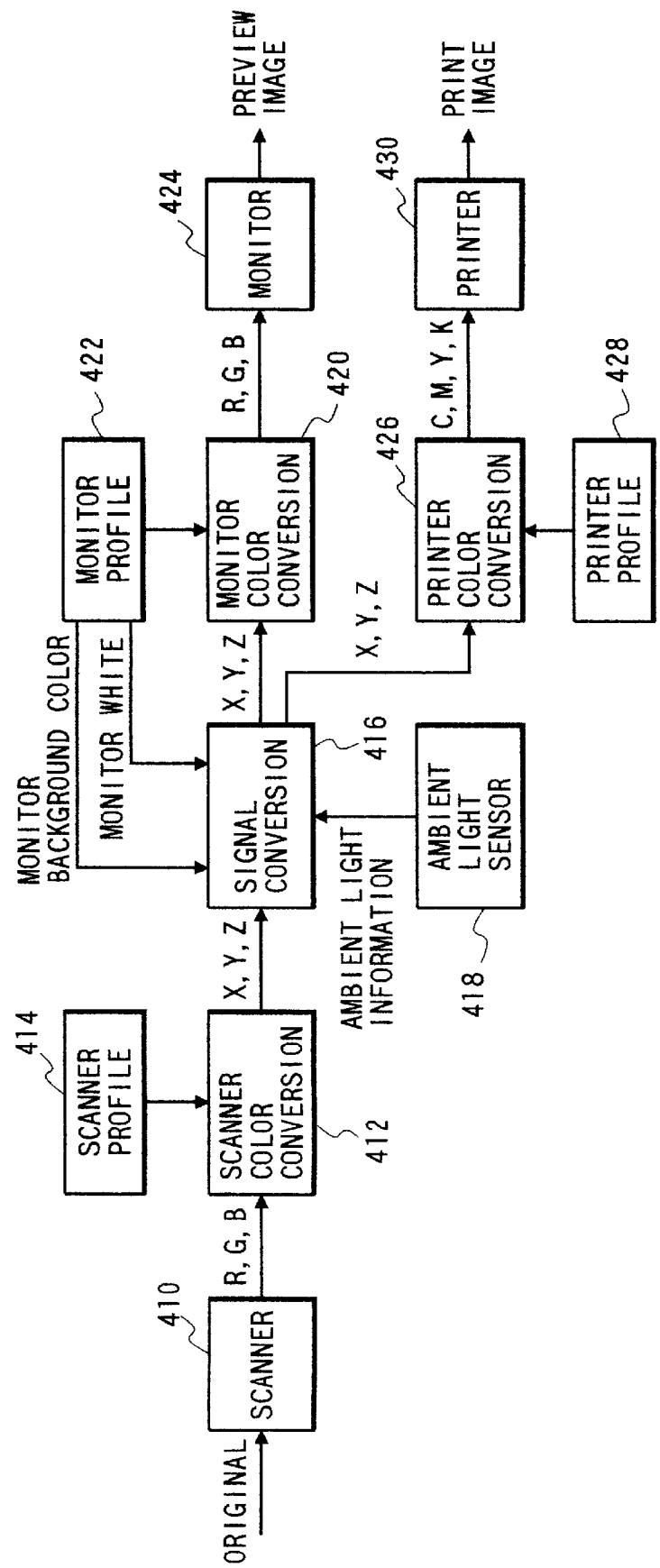
FIG. 10 is a block diagram showing the outline structure of a second embodiment.
Figure 11:
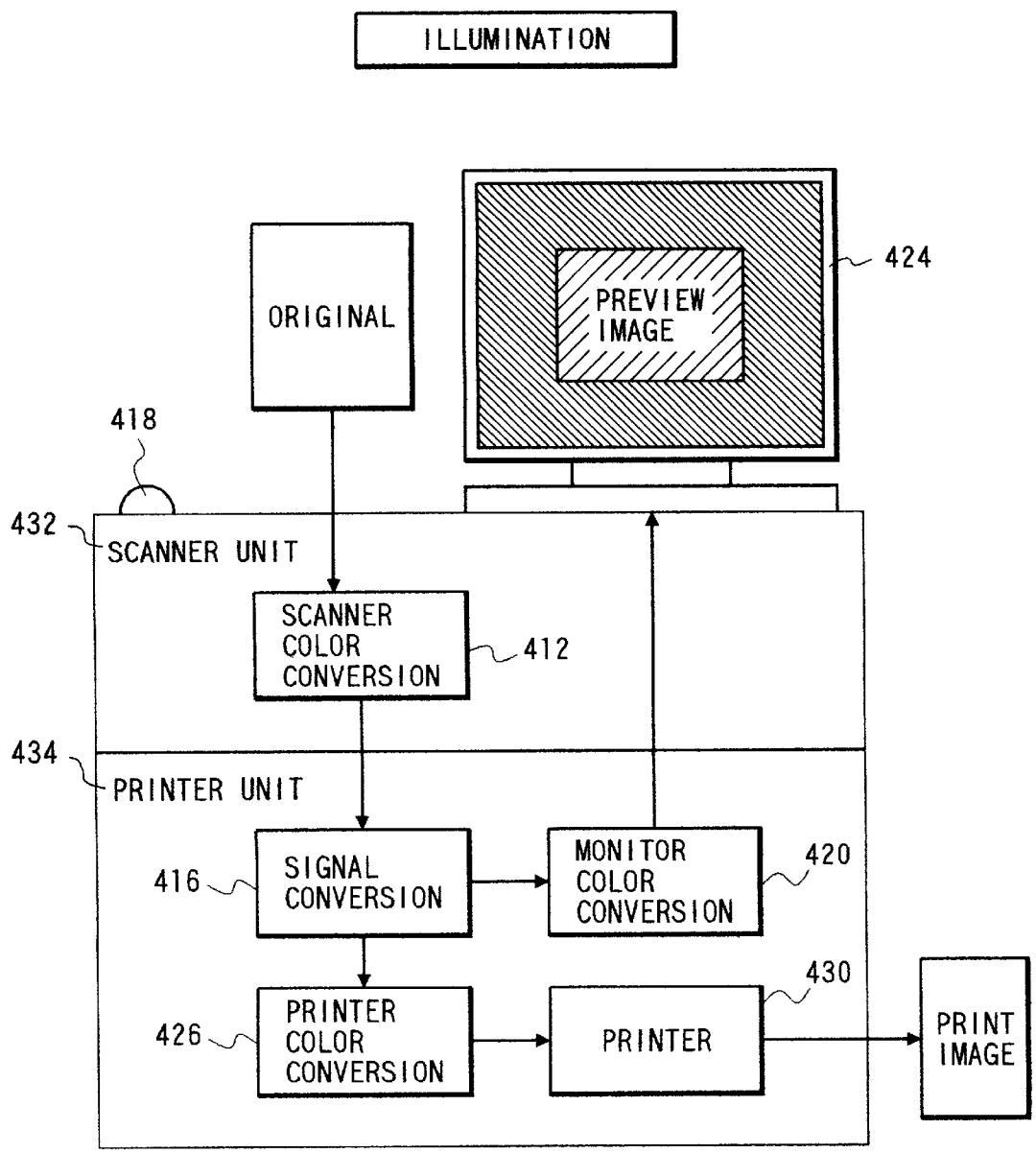
FIG. 11 is a schematic diagram showing the layout of units of the second embodiment.

This embodiment of the invention is applied to a system having a monitor for displaying an original image and a copier with a previewer having functions of selecting an output portion of the monitor image and editing colors. FIG. 10 is a block diagram showing the outline structure of the embodiment, and FIG. 11 is a schematic block diagram showing the arrangement of each functional block. In FIGS. 10 and 11, identical elements are represented by using the same reference numerals.

An original is read with an image scanner 410. The image scanner 410 outputs the read image data as RGB signals. A scanner color conversion unit 412 converts the signals of the RGB color specification system output from the scanner 410 into values of the XYZ color specification system considering the read characteristics of the image scanner 410, in accordance with a scanner profile 414 prepared in accordance with the read characteristics of the image scanner 410. The output of the scanner color conversion unit 412 is a standard color signal independent of the image input device. The standard color space is obviously not limited to the XYZ color specification system, and other color specification systems may be used so long as they can absorb the device dependency.

The scanner profile 414 stores data regarding the chromatic characteristics of the scanner 410, and is realized, for example, by a color conversion matrix from RGB to XYZ or a look-up table (LUT).

A signal conversion unit 416 corrects the output of the scanner color conversion unit 412 in accordance with ambient light information supplied from an ambient light sensor 418 and information about the white color and background color of a monitor 424 for displaying a read image. In this embodiment, the information about the white color and background color of the monitor 424 is supplied from a monitor profile 422 storing color development characteristics of the monitor 424.

In accordance with information about the color development characteristics supplied from the monitor profile 422, a monitor color conversion unit 420 converts the output signal of the XYZ color specification system supplied from the signal conversion unit 416 into RGB values of the RGB color space with the color development characteristics of the monitor 424 taken into consideration, and supplies the RGB values to the monitor 424. The monitor 424 displays a preview image of the original image.

The monitor profile 422 stores data regarding the color development characteristics, such as a color temperature and an emission luminance of the monitor 424, a chromaticity value of phosphor, and color conversion information for color conversion from color signals of a standard color space to device dependent color signals. The monitor background color information supplied from the monitor profile 422 to the signal conversion unit 416 contains information of the present background color displayed on the monitor 424 and information of the background color when the monitor profile 422 is generated.

In accordance with the color development information of a printer 430 stored in a printer color profile 428, a printer color conversion unit 426 converts the output signals of the XYZ color specification system supplied from the signal conversion unit 416 into CMYK signals with the color development characteristics of the printer 430 taken into consideration, and outputs the CMYK signals to the printer 430. In accordance with the CMYK signals supplied from the printer color conversion unit 426, the printer 430 prints out the original image on a recording sheet.

As shown in FIG. 11 with the representative units of the embodiment system, the scanner color conversion unit 412 is housed in a scanner unit 432, and the signal conversion unit 416, monitor color conversion unit 420, printer color conversion unit 426, and printer 430 are housed in a printer unit 434. The monitor 424 is placed on the scanner unit 432, and the ambient light sensor 418 is mounted on the side of the scanner unit 432.

Figure 12:
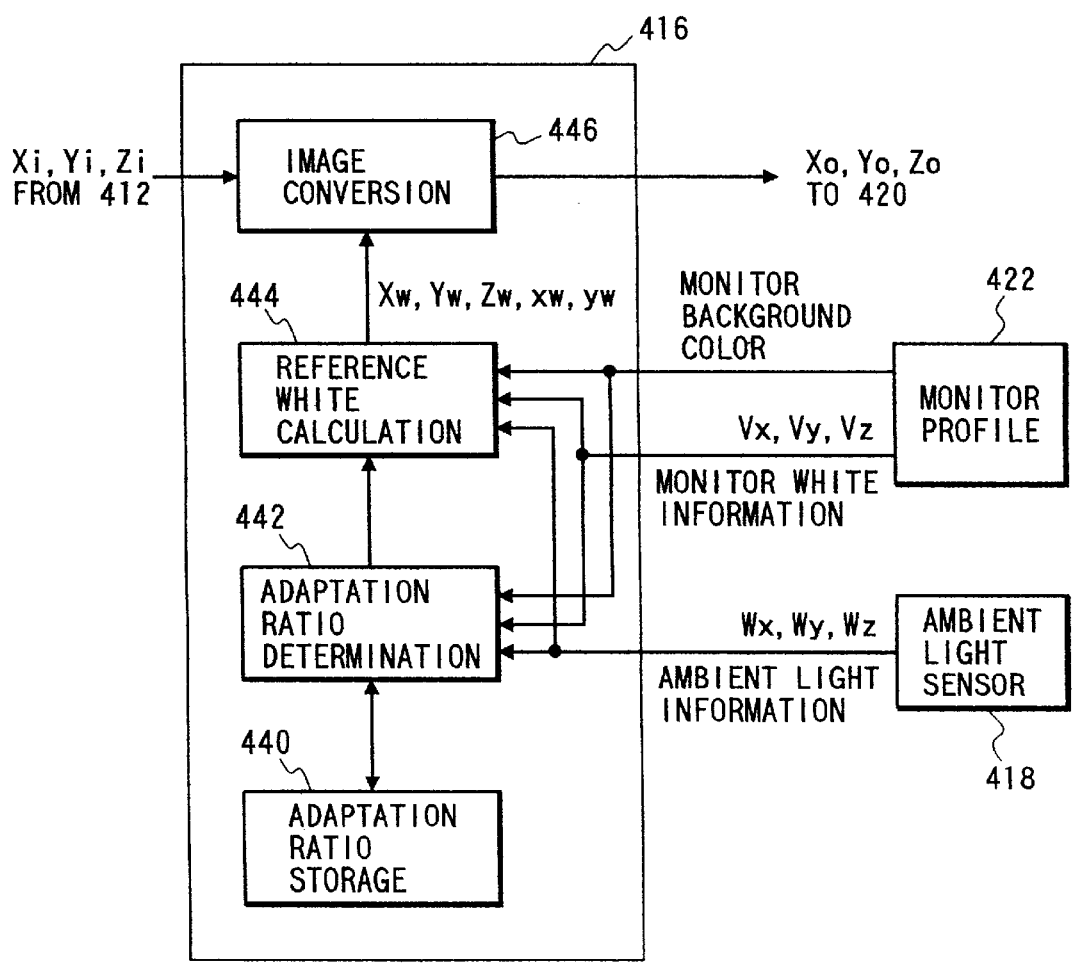
FIG. 12 is a block diagram showing the outline of the internal structure of a signal conversion unit.

FIG. 12 is a schematic block diagram showing the inner structure of the signal conversion unit 416. An adaptation ratio storage unit 440 stores adaptation ratios of one or more possible environments when ambient light is selected from predetermined reference light sources (A, C, D93, D65, D50, F, and the like). The adaptation ratio storage unit 440 also stores adaptation ratios for background colors during image observation (e.g., gray scale). An adaptation ratio determination unit 442 selects adaptation ratios for present ambient light and monitor background color from the adaptation ratio storage unit 440, in accordance with the ambient light information from the ambient light sensor 418 and monitor white color information and monitor background color information from the monitor profile 422, and supplies the adaptation ratios to a reference white color calculation unit 444.

In accordance with the adaptation ratios supplied from the adaptation ratio determination unit 442, the ambient light information supplied from the ambient light sensor 418, and the monitor white color information and monitor background color information supplied from the monitor profile 422, the reference white color calculation a unit 444 calculates reference white color suitable for observation environments such as ambient light, monitor color temperature, and monitor background color. The details of the calculation method will be later given.

In accordance with the reference white color ($X_w$, $Y_w$, $Z_w$, $x_w$, $y_w$) calculated by the reference white color calculation unit 444, an image conversion unit 446 converts the signals ($X_i$, $Y_i$, $Z_i$) supplied from the scanner color conversion unit 412 into signals ($X_o$, $Y_o$, $Z_o$) of the XYZ color specification system and outputs the latter to montior color conversion unit 420.

Figure 13:
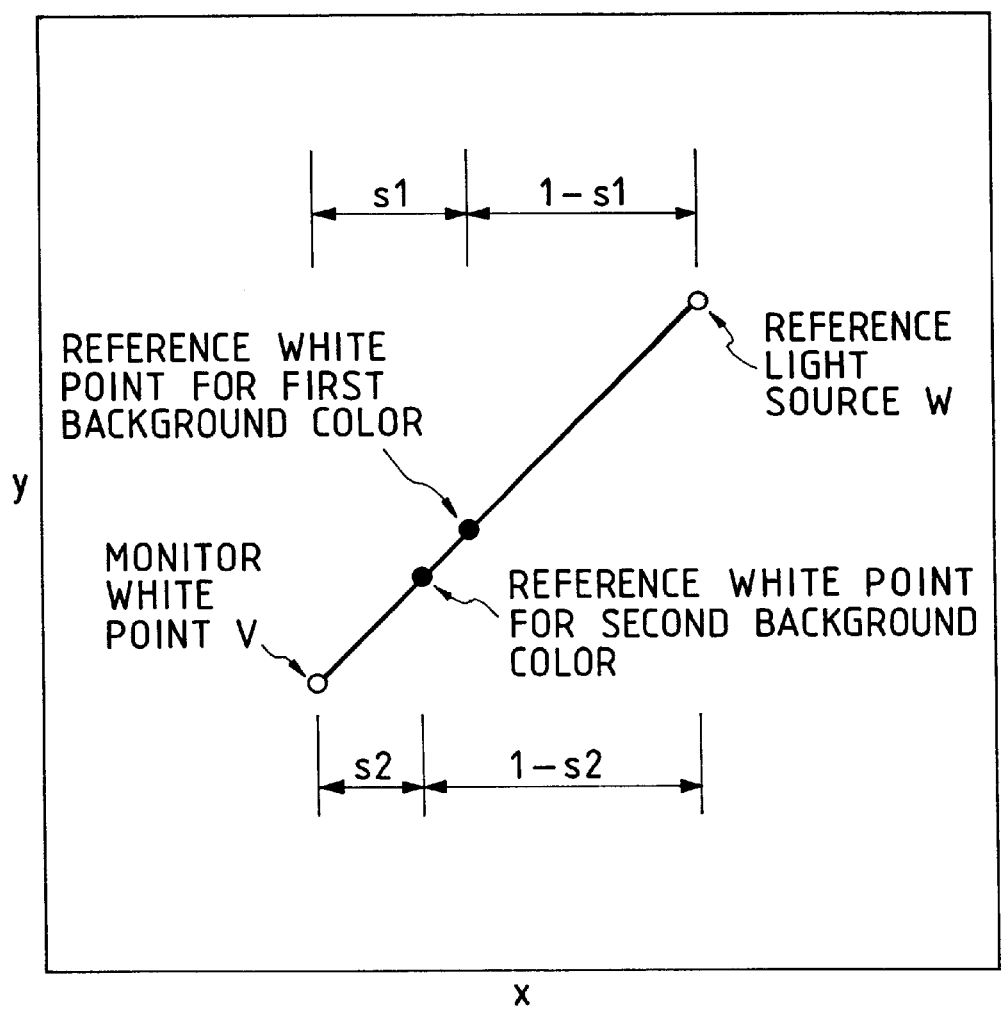
FIG. 13 is a schematic diagram showing a relationship among ambient light, monitor white light, background color, and reference color.

FIG. 13 is a schematic diagram showing the relationship among the reference white color, ambient light, monitor white color, and monitor background color. The ambient light is radiated from a reference light source. In FIG. 13, the reference white light for two background colors is shown. The output of the ambient light sensor 418 may by spectrum data, color signals of XYZ or RGB, or manually input color signals. In FIG. 13, the ambient light information is indicated as a reference light source W. The monitor white color information from the monitor profile 422 includes color temperature, or luminance and chromaticity value, and is indicated as a monitor white color point V in FIG. 13.

As described earlier, in observing an image displayed on the screen of a monitor, the human eye is considered not to be adapted only to the monitor white light, but to be adapted to both the monitor white light and ambient light. Therefore, as shown in FIG. 13, the reference white color is positioned between the monitor white light and ambient light (reference light source). The tristimulus values $X_w$, $Y_w$, and $Z_w$ and the chromaticity values $x_w$ and $y_w$ of the reference white color signals are calculated from the following equations (6) and (7) wherein an adaptation ratio for the monitor white color is represented by s, the adaptation ratio for the ambient light is represented by (1−s), the ambient light information from the ambient light sensor 18 is represented by $W_x$, $Y_y$, $W_z$, $w_x$, and $w_y$, and the monitor white color signals from the monitor profile 422 are represented by $V_x$, $V_y$, $V_z$, $V_x$, and $v_y$.

Tristimulus Values $$Xw=(1-s) \cdot Wx+s \cdot Vx$$

$$Yw=(1-s) \cdot Wy+s \cdot Vy$$

$$Zw=(1-s) \cdot Wz+s \cdot Vz \quad (6)$$

Chromaticity Values $$xw=(1-s) \cdot wx+s \cdot vx$$

$$yw=(1-s) \cdot wy+s \cdot vy \quad (7)$$

Since the adaptation ratio s depends on the ambient light and the background color of the monitor 24 during image observation, the adaptation ratio s:(1−s) changes with the ambient light and image background color. Therefore, the reference white color point also changes with the ambient light and background color. For example, if the background color is changed from black to white in a gray scale level, as the background light changes toward black, the adaptation ratio for the ambient light becomes large irrespective of the color temperature of the monitor 424 and ambient light.

Therefore, it is necessary to determine the adaptation ratio both from the ambient light and background color. In this embodiment, an optimum reference white color point is calculated in this manner.

A method of converting the entire image in accordance with the calculated reference white color signal will be described.

An image displayed on the monitor screen is observed with reference to the calculated reference white color. A printed matter is adapted to the white color of a recording sheet and ambient white color. The following equation (8), which is a modification of the VonKreis equation, is satisfied wherein the reference white light is represented by $X_w$, $Y_w$, and $Z_w$, the ambient white color is represented by $W_x$, $W_y$, and $W_z$, the image signals (input signals to the image conversion unit 446) input from the scanner color conversion unit 412 to the signal conversion unit 416 are represented by $X_i$, $Y_i$, and $Z_i$, and the image signals output from the image conversion unit 446 of the signal conversion unit 416 are represented by $X_o$, $Y_o$, and $Z_o$.

$$\begin{pmatrix} Xo/Xw \\ Yo/Yw \\ Zo/Zw \end{pmatrix} = \begin{pmatrix} Xi/Wx \\ Yi/Wy \\ Zi/Wz \end{pmatrix} \quad (8)$$

By transforming this equation (8), the following equation (9) is obtained.

$$\begin{pmatrix} Xo \\ Yo \\ Zo \end{pmatrix} = \begin{pmatrix} Xi \\ Yi \\ Zi \end{pmatrix} \begin{pmatrix} Xw/Wx \\ Yw/Wy \\ Zw/Wz \end{pmatrix} \quad (9)$$

The following equation (10) may be used which incorporates image contrast conversion taking visual sense characteristics of the human eye into consideration.

$$\begin{pmatrix} Xo/Xw \\ Yo/Yw \\ Zo/Zw \end{pmatrix} = \begin{pmatrix} Xi/Wx \\ Yi/Wy \\ Zi/Wz \end{pmatrix}^{\gamma} \quad (10)$$

By transforming equation (10), the following equation (11) is obtained.

$$\begin{pmatrix} Xo \\ Yo \\ Zo \end{pmatrix} = \begin{pmatrix} Xi/Wx \\ Yi/Wy \\ Zi/Wz \end{pmatrix}^{\gamma} \begin{pmatrix} Xw \\ Yw \\ Zw \end{pmatrix} \quad (11)$$

The monitor color conversion unit 420 converts the image signals $X_o$, $Y_o$, and $Z_o$ of the RGB color specification system obtained in the above manner into color signals of the XYZ color specification system, in accordance with the conversion information supplied from the monitor profile 422.

With the above color matching process, color hues of the source image and output image can be matched. Since the reference white color signal is determined while considering the background color, an optimum color matching process can be performed.

In this embodiment, the adaptation ratio s:(1−s) or s is determined from both the ambient light and background color. The adaptation ratio may be determined from observation environments such as a monitor color temperature and monitor reflection light, in addition to the ambient light and background color.

Figure 14:
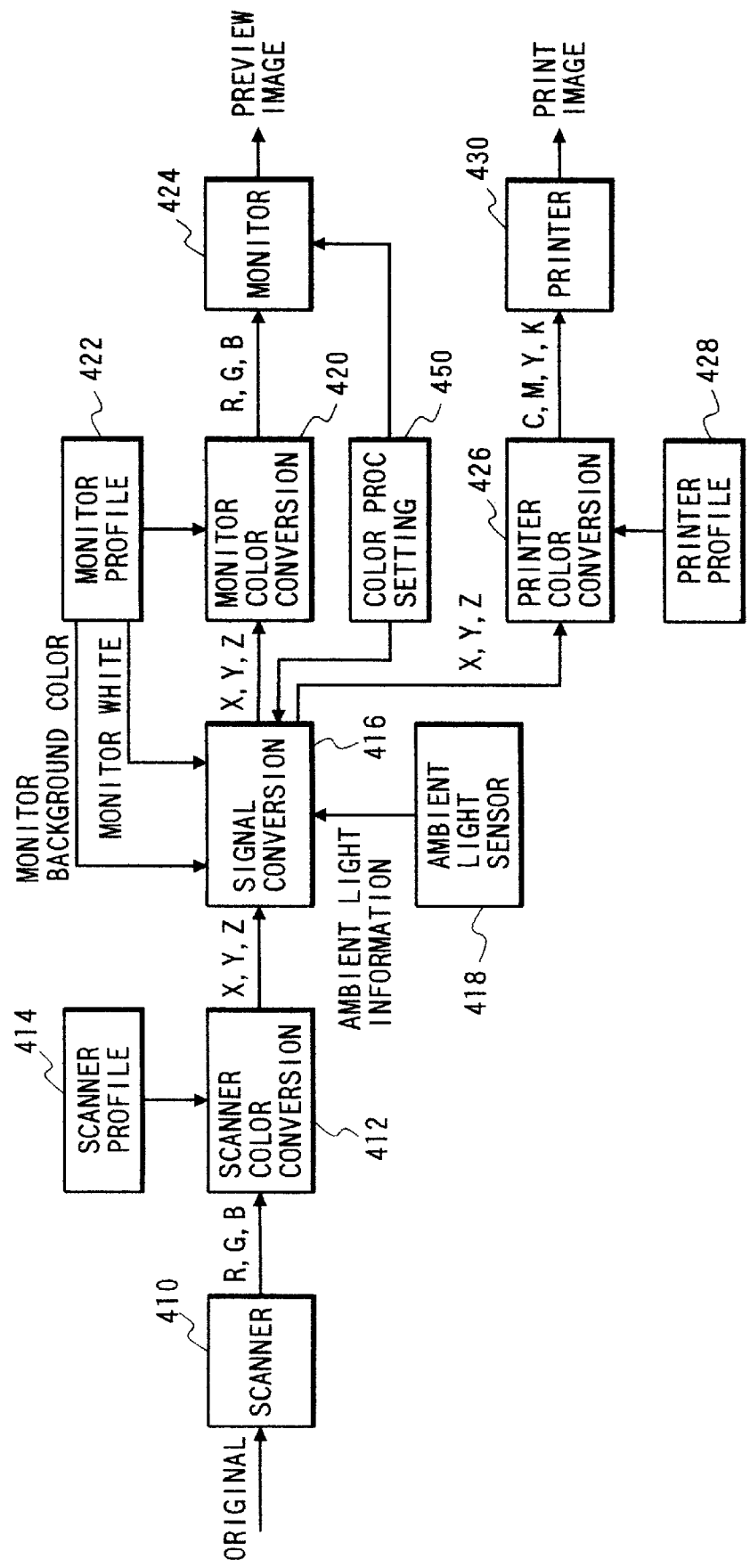
FIG. 14 is a block diagram showing the outline structure of a modification of the second embodiment.

FIG. 14 is a block diagram showing the outline structure according to a modified embodiment. In this embodiment, a desired color process is set by a user. Specifically, a predetermined background color is displayed on a monitor 424 and the entire screen of the monitor 424 is controlled, i.e., both the displayed image and the background color are controlled, to thereby more precisely match the original image displayed on the monitor with the input original image. A color process setting unit 450 is used for setting a desired color matching mode. In this embodiment, there are two modes, one using the present background color of the monitor 424 and another using a specific preselected background color. A user selects the latter mode if color management is to be conducted more precisely.

Figure 15:
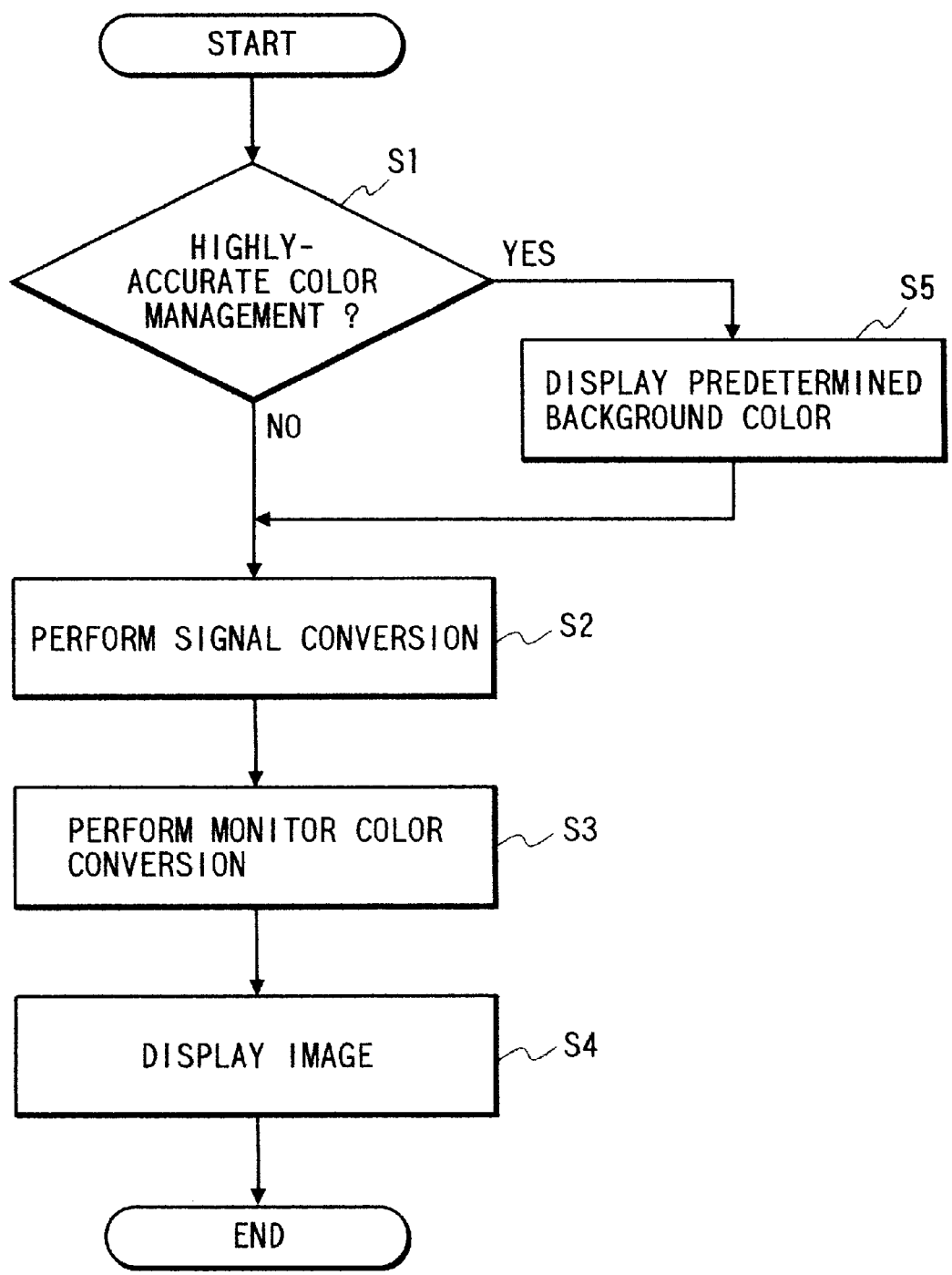
FIG. 15 is a flow chart illustrating the operation of the modification.

FIG. 15 is a flow chart illustrating the main processes of the embodiment shown in FIG. 14.

From the color process setting unit 450, a user sets a color process (color matching mode) to be executed by a signal conversion unit 416 in accordance with the color matching conditions (step S1). This setting may be performed by using a menu bar or a select button. A default may be the color management process described with the embodiment shown in FIG. 10, and high precision color management may be performed when the default is not selected.

In the case of high precision color management (step S1), the background color of the monitor 424 is set to the preset color (step S5). In the case of ordinary color management, the present background color is used.

It is necessary for high precision color management to control the background color. Therefore, if a plurality of windows are opened on the same display screen, some other windows are hidden by the background color. In the case of ordinary color management, parallel processing is possible while referring to other windows. Therefore, a user sets at step S1 the color matching mode in accordance with the color matching conditions (whether the color matching precision is preferentially performed).

The succeeding operations are substantially the same as the embodiment shown in FIG. 10. A signal conversion unit 416 sets an optimum adaptation ratio in accordance with the ambient light information from an ambient light sensor 418 and the monitor white color information and monitor background color, and in accordance with a reference white color signal determined from the adaptation ratio, the output signal from a scanner color conversion unit 412 is converted (step S2). A monitor color conversion unit 420 converts the output signal from the signal conversion unit 416 from the XYZ color specification system into the RGB color specification system (step S3). The output image signal of the monitor color conversion unit 420 is displayed on a monitor 424 at a predetermined area (step S4).

In the case of high precision color management, the preset background color is used so that color matching can be performed more precisely. The background color includes background colors set under the environment when the profile is formed, or set under standard environments during color observation, and background colors most suitable for respective environments. The background color is selected from these background colors, in accordance with the present environments.

In the embodiment shown in FIG. 14, the preset background color is only displayed when the high precision color management is selected. Whether or not color management is preformed may be made selectable, and if the color management is to be performed, the preset background color is automatically displayed.

As previously described, for the monitor background color during image observation, standard observation conditions when the profile is generated are determined and the information of the conditions are stored in the profile. In either case, it is preferable that the luminance of white in an observed image (white in a printed image) is lower than that of the background color displayed on the monitor, in order to make both white colors equal. White in an observed image (white in a printed image) can be determined from the ambient light information obtained by the ambient light sensor 418 and the reflectivity of a recording sheet. If the luminance of white in a printed image is lower than that of the highest output on the monitor screen, it is preferable that the luminance of the background color is lower than that of white in an observed image.

For example, if an image is observed under the environment that the luminance of white in an observed image is equal to that of the highest luminance of the monitor and thereafter the luminance of ambient light in the room lowers, the monitor background color is too bright and color matching is impossible. However, if the luminance of white in an observed image is made lower than that of the monitor background color, an environment to more easily perform color matching can be realized.

The ambient light information may be obtained by detecting ambient light under the image observation environment or by measuring ambient light with an illumination meter or a luminance meter and entering the measured value to the signal conversion unit 416. Alternatively the ambient light data may be obtained by selecting the ambient light data most suitable for the present environment from a predetermined number of ambient light selection items.

White in an observed image is calculated from the ambient light information and the reflectivity of a recording sheet, and the monitor background color is changed so that the luminance of the monitor background color is lower than that of white in the observed image.

The invention is not limited to the above embodiments. For example, the invention is applicable to color signal conversion for various types of input/output devices. The invention is also applicable to most image processing apparatus which perform color signal conversion.

Obviously, the monitor display is not only limited to a CRT display, and a liquid crystal display may be used.

<Modification>

In the first and second modifications, the adaptation ratios are stored in the adaptation ratio storage unit in correspondence with a plurality of light sources.

Figure 16:
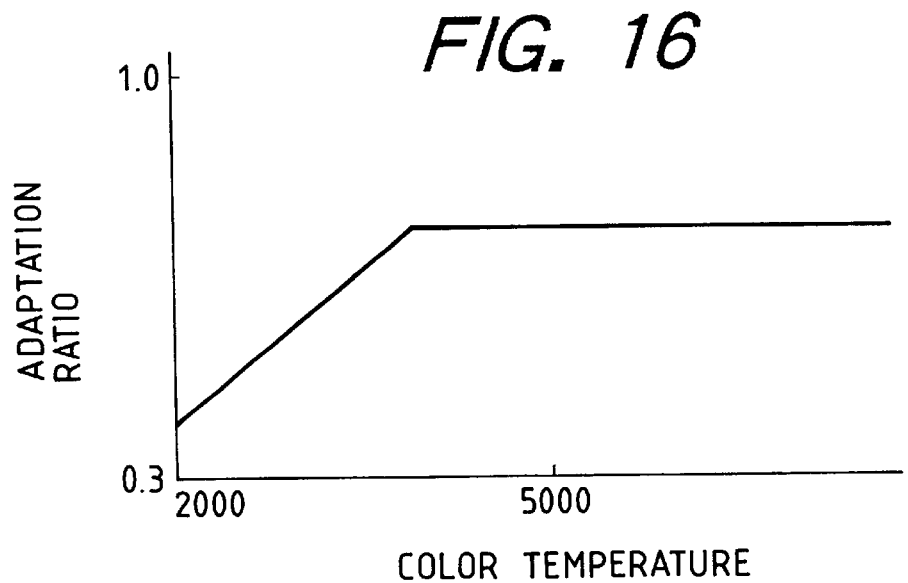
FIG. 16 is a diagram illustrating conventional observation environments of an image.

In this modification, attention is paid to a predetermined relationship between the adaptation ratio and a color temperature as shown in FIG. 16. The adaptation ratio storage unit of this modification therefore stores a table of a function between the color temperature and adaptation ratio shown in FIG. 16, and the adaptation ratio corresponding to the color temperature of ambient light detected with an ambient light sensor is determined from this table.

<Other Embodiments>

The present invention may be applied to a system constituted by a plurality of apparatuses (e.g., a host computer, interface units, a reader, a printer, and the like) or to a system constituted by a single apparatus (e.g., a copier or a fax).

The scope of the invention also includes a system or apparatus whose computer (CPU or MPU) operates various devices connected thereto in accordance with software program codes supplied to the system or apparatus so as to realize the functions of the above embodiments.

In this case, the software program codes realize the embodiment functions. Therefore, the program codes and means for supplying such program codes to a computer, e.g., a storage medium storing such program codes, constitute the present invention.

The storage medium for storing such program codes includes a floppy disk, a hard disk, an optical disk, a magnetooptic disk, a CD-ROM, a magnetic tape, a nonvolatile memory card, a ROM, and the like.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also obviously includes the case wherein in accordance with the program codes stored in a memory of a function expansion board or unit connected to the computer supplied with the program codes, a CPU or the like of the function board or unit executes part or the entirety of the actual tasks for realizing the embodiment functions.

The invention has been described in connection with the above preferred embodiments. The invention is not limited to only the above embodiments, but various modification are possible without departing from the scope of the appended claims.

What is claimed is:

1. An image processing apparatus for executing, under ambient light, a conversion process according to the ambient light to match color appearances of an input image and a displayed image with each other, said apparatus comprising:
    input means for inputting a white value of a display device and a white value of the ambient light;
    generating means for generating a reference white value from the white value of the display device and the white value of the ambient light; and
    converting means for executing the conversion process to convert the white value of the ambient light into the reference white value, to image data representing the input image.

2. An apparatus according to claim 1, wherein said generating means calculates the reference white value from the white value of the display device and the white value of the ambient value by using an adaptation ratio corresponding to the ambient light.

3. An apparatus according to claim 1, further comprising detecting means for detecting ambient light information.

4. An apparatus according to claim 2, wherein the adaptation ratio is different for respective types of ambient light.

5. An apparatus according to claim 2, wherein the adaptation ratio is obtained by using a table for storing a relationship between a color temperature and an adaptation ratio.

6. An apparatus according to claim 1, further comprising output means for outputting the conversion processed image signal to a monitor.

7. An image processing apparatus for executing a conversion process according to ambient light comprising:
    first conversion means for converting an image signal read with an input means into a first image signal of a common color space;
    determining means for determining an adaptation ratio in accordance with ambient light information;
    generating means for generating a reference white value by synthesizing a white value of an output device and a white value of the ambient light on a basis of the adaptation ratio;
    second conversion means for executing the conversion process for the first image signal in accordance with the reference white value to generate a second image signal; and
    third conversion means for converting the second image signal into a third image signal for output from the output device.

8. An image processing apparatus according to claim 7, wherein said input means is a scanner, and said output means is a monitor.

9. An image processing apparatus according to claim 7, wherein said input means is a scanner, and said output device is a printer.

10. An image processing method of executing, under ambient light, a conversion process according to the ambient light to match color appearances of an input image and a displayed image with each other, comprising the steps of:
    inputting a white value of a display device;
    inputting a white value of an ambient light;
    generating a reference white value from the white value of the display device and the white value of the ambient light; and
    executing the conversion process to convert the white value of the ambient light into the reference white value, to image data representing the input image.

11. A method according to claim 10, wherein said generating step calculates the reference white value from the white value of the display device and the white value of ambient value by using an adaptation ratio corresponding to the ambient light.

12. A method according to claim 10, further comprising a detecting step of detecting ambient light information.

13. A method according to claim 11, wherein the adaptation ratio is different for respective types of ambient light.

14. A method according to claim 11, wherein the adaptation ratio is obtained by using a table for storing a relationship between a color temperature and an adaptation ratio.

15. A method according to claim 10, further comprising an output step of outputting the conversion processed image signal to a monitor.

16. A computer readable medium having recorded thereon codes for implementing a computer implementable method of image processing for executing, under ambient light, a conversion process according to the ambient light to match color appearance of an input image and a displayed image with each other, comprising the steps of:
    inputting a white value of a display device;
    inputting a white value of the ambient light;
    generating a reference white value from the white value of the display device and the white value of the ambient light; and
    executing the conversion process to convert the white value of the ambient light into the reference white value, to image data representing the input image.

17. An image processing method of executing a conversion process according to ambient light, said method comprising the steps of:
    inputting a white value of the output device described in the profile;
    inputting a white value of an ambient light; and
    executing the conversion process for an image signal on a basis of the white value of the output device and the white value of the ambient light and background color information when the output image output by the output device is observed.

18. A method according to claim 17, wherein said generating step calculates the reference white value corresponding to the white value of the device and the white value of the ambient light by using an adaptation ratio corresponding to the background color information.

19. A method according to claim 18, wherein the more the background color is near black, the adaptation ratio for the ambient light becomes larger.

20. A method according to claim 17, wherein said output device is a monitor.

21. A computer readable medium having recorded thereon codes for implementing a computer implementable method of executing a conversion process according to ambient light, said method comprising the steps of:

inputting a white value of the output device described in the profile;

inputting a white value of an ambient light; and executing the conversion process for an image signal on a basis of the white value of the output device and the white value of the ambient light and background color information when the output image output by the output device is observed.

22. An image processing apparatus for executing a conversion process according to ambient light, said apparatus comprising:

means for inputting a white value of the output device described in the profile;

means for inputting a white value of an ambient light; and means for executing the conversion process for an image signal on a basis of the white value of the output device and the white value of the ambient light and background color information when the output image output by the output device is observed.

23. An image processing method of executing a conversion process according to ambient light comprising:

a first conversion step of converting an image signal read with an input means into a first image signal of a common color space;

a determining step of determining an adaptation ratio in accordance with ambient light information;

a generating step of generating a reference white value by synthesizing a white value of an output device and a white value of the ambient light on a basis of the adaptation ratio;

a second conversion step of executing the conversion process for the first image signal in accordance with the reference white value to generate a second image signal; and a third conversion step of converting the second image signal into a third image signal for output from the output device.

24. A computer readable medium having recorded thereon codes for implementing a computer implementable method of executing a conversion process according to ambient light, said method comprising:

a first conversion step of converting an image signal read with an input means into a first image signal of a common color space;

a determining step of determining an adaptation ratio in accordance with ambient light information;

a generating step of generating a reference white value by synthesizing a white value of an output device and a white value of the ambient light on a basis of the adaptation ratio;

a second conversion step of executing the conversion process for the first image signal in accordance with the reference white value to generate a second image signal; and a third conversion step of converting the second image signal into a third image signal for output from the output device.

* * * * *